Jan. 19, 1932. C. E. MAYNARD 1,841,490

VULCANIZING PRESS

Filed June 6, 1927

INVENTOR.
Charles Edgar Maynard
BY
Edward C. Taylor
ATTORNEY.

Patented Jan. 19, 1932

1,841,490

UNITED STATES PATENT OFFICE

CHARLES E. MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

VULCANIZING PRESS

Application filed June 6, 1927. Serial No. 196,665.

This invention relates to presses adapted for vulcanizing rubber articles and has been shown with particular reference to the manufacture of rubber inner tubes for pneumatic tire casings.

The object of the invention is to provide a press which will close the mold and lock it firmly against the action of the internal fluid pressure which is used in the article, this closing and locking being accomplished as a single operation automatically performed by the press in closing. A further object is to provide a press of this character which is convertible for different sizes of molds.

Referring to the drawings.

Figures 1, 2:
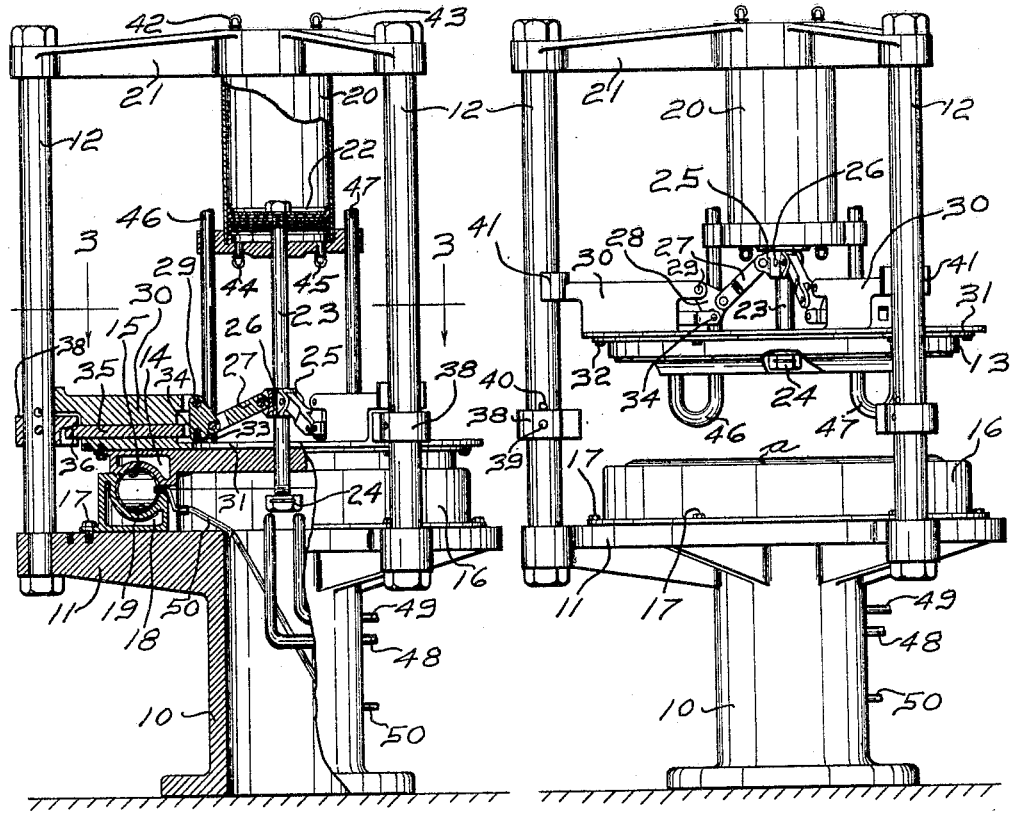
Fig. 1 is a side elevation of my improved press, partly in section and showing the mold closed.
Fig. 2 is a side elevation showing the mold open.
Figure 3:
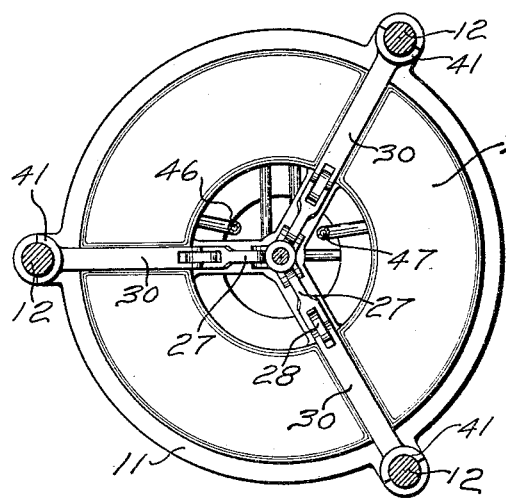
Fig. 3 is a section on line 3—3 of Fig. 1.

The press is mounted upon a base 10 supporting a platen 11. From this platen rise posts 12 which serve as guides for an upper movable mold 13 cored out as at 14 to provide a steam chamber for heating, and presenting a molding cavity 15 to receive the tube or other article to be vulcanized. The lower mold section 16 is supported upon the platen 11 by screws 17 and is cored out at 18 to provide a heating chamber. This lower mold section is cut to present a molding cavity 19 preferably of greater cross-sectional extent than the upper mold section in order to facilitate the insertion of the tube and to insure that the tube will remain in the lower mold half, all of which is well understood in the art.

A pneumatic cylinder 20 is secured to a head 21 mounted upon the posts 12 and carries a piston 22 having a rod 23 extending from it. This rod extends freely through the upper mold section 13 and has a nut 24, firmly secured to its lower end, which in the upward travel of the arm from the position of Fig. 1 causes the mold section to move with the piston rod after the latter has had a short upward free movement. A three-branched yoke 25 is secured to the rod 23 by a pin 26. Links 27 join this yoke to forked rocking arms 28, each of which is secured by a pivot 29 to a member 30. These three members are arranged equally spaced around the circumference in line with the posts 12 and are preferably formed integral with a ring 31 which is secured to the top mold section 13 by screws 32 so that the ring 31 in effect serves as the upper platen of the press. The rocking arms 28 are provided with slots 33 each receiving a pin 34 attached to a slide 35 running in the member 30. Each slide has a beveled end 36 running in a slot 37 in a member 38, secured to one of the posts 12 by a pin 39 passing through one of a number of holes 40. By changing the pin from one hole to another adjustment may be made for different sizes of molds. The members 30 are preferably formed at their outer ends with guiding portions 41 which partially encircle the posts 12 and keep the upper mold platen in proper alignment.

Inlet and exhaust pipes 42 and 43 connecting with the top of the cylinder 20, and inlet and exhaust pipes 44 and 45 connecting with the bottom thereof, provide for moving the piston either upwardly or downwardly at the will of the operator, it being understood that these are connected to a source of compressed air through any of the usual or desired type of valve mechanism. Steam inlet and exhaust pipes 46 and 47, preferably made flexible, join the chamber 14 in the upper mold section with a source of steam whereby the mold may be heated. Similar connections 48 and 49 are made to the lower section. Since the tube $a$ is to be expanded outwardly into the mold cavity during vulcanization an air pipe 50 is connected to the valve 51 of the tube and air under pressure admitted as is customary in the art.

With the parts in the position of Fig. 2 the tube $a$ is slightly inflated and positioned in the lower mold cavity 19. Air is then admitted to the upper side of the piston 22 and exhausted from the lower side so that the rod 23 is caused to descend. At the start of this descending movement the upper left section is supported by the nut 24. After the upper mold section is lowered into contact with the lower section the rod 23 slides through the upper section as is clearly shown in Fig. 1. The yoke 25 being pinned to the piston rod at 26, continues to move downwardly, forcing the swinging arms 28 outwardly by a toggle action and forcing the slides 35 outwardly into the slots 37. The final locked position of the mold is shown in Fig. 1.

It will be seen that the operation of lowering the upper mold half and locking the same firmly in position so that the pressure within the tube cannot open the mold, irrespective of the condition of pressure within the cylinder 20, has been accomplished by a single motion of the piston rod 23 initiated by the act of the operator in turning the proper valve mechanism. This greatly increases the number of presses which a single operator can attend to. Once the valve is turned he needs to pay no further attention to the press. It also presents an advantage over former vulcanizing presses in that there is no manual labor connected with the locking of the press whereas former presses of this general type have required considerable exertion to lock them firmly in closed position.

Figure 4:
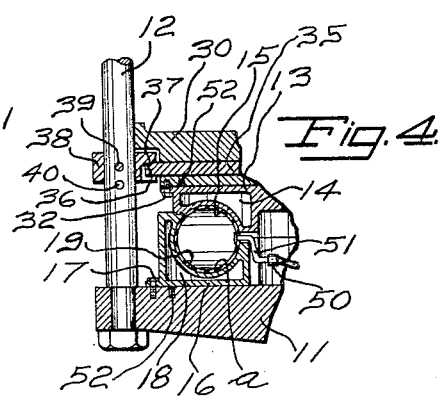
Fig. 4 is a detail corresponding to Fig. 1 but showing the application of a different size of mold to the press.

If it is desired to change the size of the mold it is only necessary to remove the bolts 32 and 17 and the steam connections to the two mold halves. Additional holes for these screws may be provided as indicated at 52 in Fig. 4. It is not necessary to make any fluid tight seals in changing the mold sections from one size to another, as the steam chambers are entirely formed by the cored out portions of the mold sections.

Having thus described my invention, I claim:

1. A mold press having opposed platens, power means for moving one platen towards or away from the other, a lost motion connection between the power means and the platen, locking devices carried by the movable platen, connections between the power means and the devices whereby the devices are projected radially during the period of lost motion, and locking means secured to the stationary platen and cooperating with the devices to hold the two platens locked together.

2. A mold press for annular articles having a plurality of mold sections, vertical guide rods upon which one of said mold sections is reciprocably mounted, movable mold locking members carried by the reciprocable mold section, stationary locking members secured to said guide rods, and means operable when the mold sections are in closed relation for moving the movable locking members into engagement with the stationary locking members to hold the hold sections closed.

3. A mold press for annular articles which comprises a frame including vertical guide rods, a stationary mold section supported by the frame, a mold section reciprocably mounted on said rods for movement toward and from the stationary section, movable locking members carried by the reciprocable section, stationary locking members secured to the guide rods, power means, supported by the frame and operably connected to the reciprocable section, and means operable when the mold sections are in closed relation for moving the movable locking members into engagement with the stationary locking members to hold the mold sections closed.

CHARLES E. MAYNARD.